VERIFICATION OF MAGNETIC RECORDING

Filed Dec. 23, 1968 2 Sheets-Sheet 1

INVENTOR
N. A. LEIFER
BY D. E. Snedeker
ATTORNEY

Oct. 20, 1970 N. A. LEIFER 3,535,687

VERIFICATION OF MAGNETIC RECORDING

Filed Dec. 23, 1968 2 Sheets-Sheet 2

United States Patent Office 3,535,687

Patented Oct. 20, 1970

3,535,687

VERIFICATION OF MAGNETIC RECORDING

Noel A. Leifer, Pine Brook, N.J., assignor to Bell Telephone Laboratories, Incorporated, Murray Hill, N.J., a corporation of New York Filed Dec. 23, 1968, Ser. No. 786,254
Int. Cl. G11b *5/06, 5/46, 27/36*
U.S. Cl. 340—174.1 7 Claims

ABSTRACT OF THE DISCLOSURE

Verification of NRZI recording on an incremental magnetic tape recorder is accomplished by a read-after-write operation using the voltage induced in the record transducer when the record signal opposes the pre-bias magnetization of the tape. A controlled amount of overshoot is provided to the tape at the end of each incremental step to generate a reliable verification signal of maximum amplitude.

BACKGROUND OF THE INVENTION

This invention relates to magnetic recording systems and, more particularly, to an arrangement for verifying the recording of information by an incremental magnetic recorder.

In the recording of digital information on a magnetic surface, errors may be caused, for example, by imperfections in the magnetic surface, or by variations in the spacing or contact between the record transducer and the magnetic surface. Ideally, such errors should be detected immediately upon recording so as to permit the taking of appropriate action such as correction of the erroneously recorded information. A number of arrangements are known for performing this function with regard to the recording of information on non-incremental magnetic recorders. Unfortunately, however, considerable difficulty has been encountered heretofore in providing a simple, reliable and inexpensive method for verifying the proper recording of information on an incremental magnetic recorder.

In the past numerous attempts to solve this problem have met with only limited degrees of success. For example, in accordance with one known system, the current in the record transducer is monitored to determine whether or not the information to be recorded is being applied to the magnetic surface. This method does not give assurance, however, that the magnetic surface is properly responding to the signals applied by the record transducer.

According to another known incremental recording verification system, a test signal is first stored on the magnetic surface and is detected immediately thereafter by reverse stepping the magnetic surface. During the reverse step the test signal is sensed by the transducer so as to verify the proper recording thereof. Thereafter the magnetic surface is forward-stepped to record the desired information on the magnetic surface. This method, of course, does not monitor the actual information recorded and further suffers from the various disadvantages associated with having to first record a test signal and with having to reverse-step the magnetic surface.

It has also been proposed to use a transducer having a record gap and a read gap spaced apart along the path of the magnetic surface, the read gap sensing information recorded earlier by the record gap. Of necessity, however, the physical spacing between the record gap and the read gap must be typically fifty to one hundred bits along the magnetic surface. Consequently, the magnetic surface must be stepped a considerable number of increments, on the order of fifty or more, before the recorded information can be verified. Moreover, the accuracy required for the stepping mechanism in such a verification system makes it extremely costly.

Known incremental magnetic tape recorders of the type disclosed in C. F. Ault patent application Ser. No. 681,225, filed Nov. 7, 1967, using a single narrow gap transducer both for recording and for verification immediately after recording, though generally satisfactory, have been found to produce verification signals which vary widely in amplitude with small variations in the recorder stepping rate, tending to reduce the reliability of such verification arrangements.

SUMMARY OF THE INVENTION

Accordingly, a general object of this invention is to provide verification of recording by an incremental magnetic recorder without the disadvantages of known arrangements.

Another object of this invention is to provide simple, reliable and inexpensive verification of recording by an incremental magnetic recorder immediately after recording, requiring a minimum of modification of the operation and circuitry of the incremental recorder.

A further object of the invention is to provide simple, reliable and inexpensive verification of incremental magnetic recording in the non-return-to-zero (NRZI) mode, without modifying or terminating the NRZI recording signal.

Yet another object of this invention is to provide reliable verification of incremental magnetic recording which is substantially independent of the stepping rate of the recorder.

In an illustrative incremental magnetic tape recorder embodiment of the present invention, the above and other objects are attained by effecting verification immediately after recording, using the record transducer for both recording and verification. When the recording current applied to the transducer opposes a bias magnetization previously applied to the tape, a magnetic transition occurs on the tape at the leading edge of the transducer. If the tape is backed up slightly at the end of the step, such as due to overshoot of the tape drive, the magnetic transition is moved upstream of the transducer. As the tape is again advanced incrementally the transition moves toward the head causing a change in flux therethrough. This flux change is detected and utilized for recording verification. No modification of the record transducer or the recording circuitry is required, nor is it necessary to alter the recording operation in any manner. Simple, well-known readout circuitry is connected to the transducer for detecting the flux change, providing verification of recording.

According to a feature of my invention, apparatus is provided in conjunction with the incremental stepping mechanism of the recorder for controlling the overshoot of the tape at the end of each incremental advance. I have found that, by providing a predetermined amount of overshoot at the end of each incremental advance of the tape, a reliable verification signal of maximum amplitude is produced substantially independent of variations in the stepping rate of the recorder.

BRIEF DESCRIPTION OF THE DRAWING

The above and other objects and features of the invention may be fully apprehended from the following detailed description and the accompanying drawing in which.

DETAILED DESCRIPTION OF THE INVENTION

Figure 1:
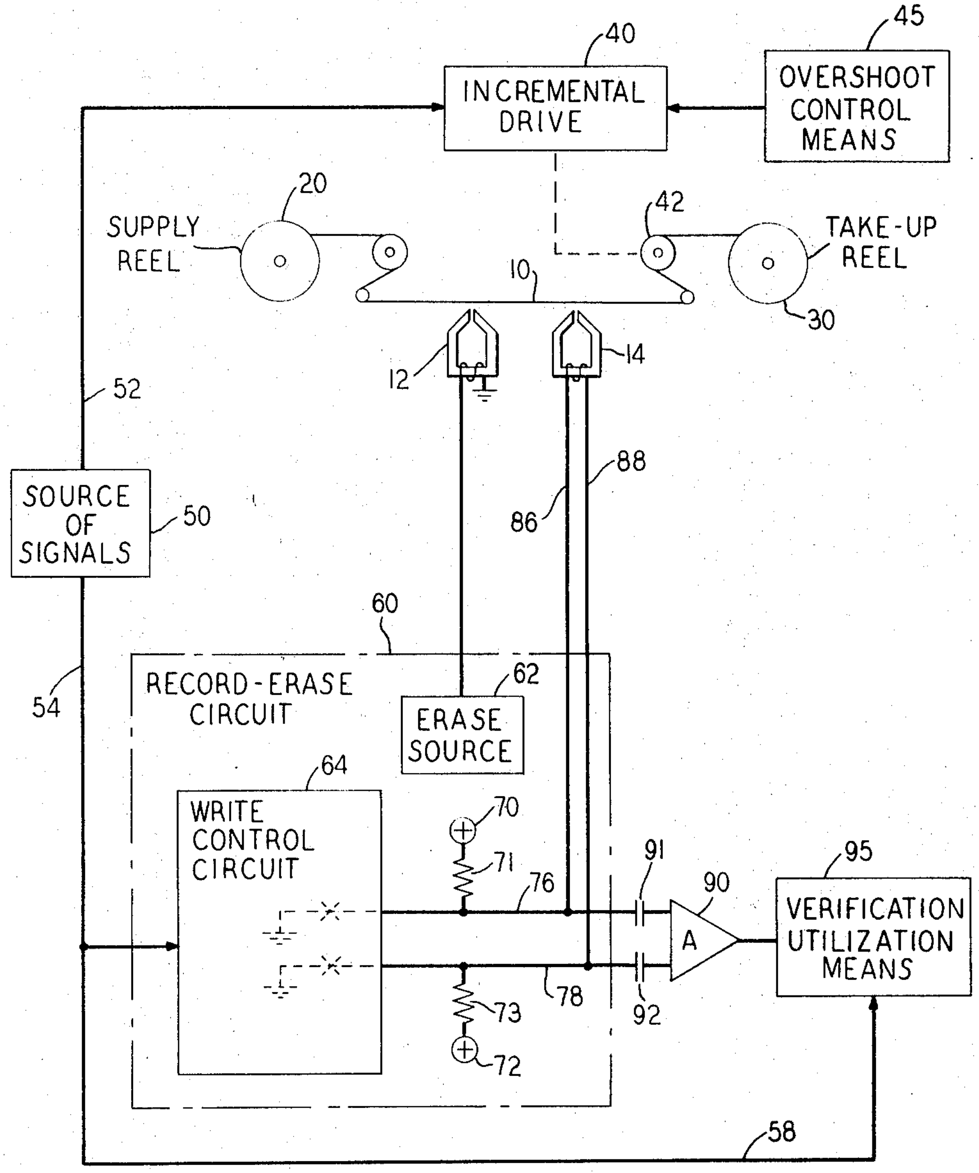
FIG. 1 is a block diagram representation of an illustrative embodiment of an incremental magnetic tape recorder arranged for recording verification in accordance with the principles of my invention.

For the purposes of description of the invention, the illustrative embodiment shown in FIG. 1 of the drawing depicts an incremental recorder utilizing magnetic tape as the information storage medium. The incremental recorder in FIG. 1 is assumed to record information in the NRZI mode and is assumed to record on-the-fly, that is, to record during incremental stepping of the tape. It will be apparent, however, from the description below that the present invention may be readily employed in connection with other types of incremental magnetic recorders, utilizing other than magnetic tape as a storage medium, for example.

The incremental recorder in FIG. 1 comprises a conventional magnetic record transducer 14 situated adjacent magnetic tape track 10 such that the single signal translating gap of transducer 14 is in recording relationship with track 10. Magnetic track 10 moves longitudinally from left to right in FIG. 1 along a path adjacent transducer 14 between supply reel 20 and takeup reel 30. The movement of track 10 along this path is effected in substantially equal incremental steps under control of incremental drive 40 coupled to driving capstan 42. Control path 52 connects incremental drive 40 to source of signals 50 to control the application of driving energy to capstan 42, and thus track 10, in accordance with the presentation of signals by source 50 to be recorded.

Incremental drive 40 may comprise any of the various known forms of incremental transport mechanisms for advancing track 10 in substantially equal step increments. The step increments may be, for example, on the order of five mils each for a bit packing density on the order of 200 bits per inch. Overshoot control means 45 coupled to incremental drive 40 in accordance with my invention may comprise any of the various known forms for controlling the overshoot of drive 40 at the end of each incremental step.

Figure 3:
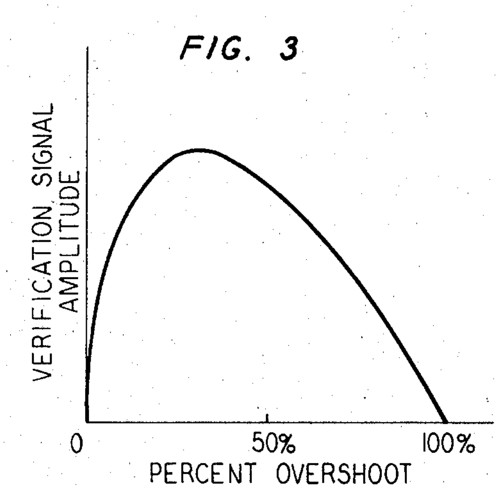
FIG. 3 depicts a typical relationship between overshoot and verification signal amplitude for an illustrative recording verification embodiment.
Figure 4:
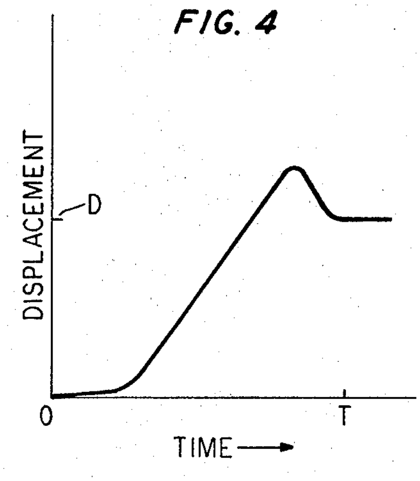
FIG. 4 depicts a typical incremental step displacement for the illustrative embodiment of FIG. 1.

Thus, by way of illustration and for the purposes of description herein, incremental drive 40 may be assumed to comprise a conventional stepper motor having a magnetic detent at each step position, and control means 45 may comprise a friction drag brake coupled to the motor drive shaft. Varying the frictional drag on the motor shaft via the brake controls the amount of step overshoot of the motor and thus of track 10. Controlling the amount of overshoot at the end of each incremental advance of track 10 in this manner produces a reliable verification signal of maximum amplitude substantially independent of variations in the stepping rate of drive 40. A typical relationship between step overshoot and verification signal amplitude for the illustrative drive and overshoot control embodiment assumed above is depicted in FIG. 3, the maximum verification signal amplitude illustratively occurring with an overshoot on the order of thirty percent. A typical incremental step displacement of track 10 with controlled overshoot is depicted in FIG. 4, track 10 being stepped a distance D, which may be on the order of five mils, during a stepping interval O–T, which may be on the order of four or five milliseconds.

Source of signals 50 is coupled over lead 54 to record transducer 14 through record-erase circuit 60 and may include any source presenting signals on lead 54 to be recorded serially on magnetic track 10. The signals presented on lead 54 by source 50 may comprise, for example, asynchronous or randomly appearing binary digits of information, drive 40 responding to each digit presented by source 50 to step track 10 incrementally for recording the digit.

Record-erase circuit 60 is responsive to the information signals presented on lead 54 for providing suitable corresponding signals over leads 86 and 88 to transducer 14 to effect recording of the signals on track 10 in the NRZI mode. By way of example, record-erase circuit 60 includes write control circuit 64 and a pair of potential sources 70 and 72. Source 70 is connected via resistor 71 over lead 76 to lead 86, and source 72 is similarly connected through resistor 73 over lead 78 to lead 88. Write control circuit 64 connects ground potential to one of leads 76 and 78 at all times, current flowing over the other of leads 76 and 78 providing a recording signal to transducer 14 for saturating a portion of track 10 adjacent transducer 14.

In accordance with the NRZI mode of recording assumed for the embodiment of FIG. 1, a reversal of the magnetic saturation of track 10, either from a "+" to a "−" or from a "−" to a "+," represents a digit of one binary character, such as binary "1," while the continuation of the magnetic saturation in the same polarity represents a digit of the other binary character, such as binary "0." Thus, for example, assume that ground potential is connected to lead 76 by write control circuit 64, current accordingly flowing from source 72 through resistor 73 over leads 78 and 88 through the winding of transducer 14 over leads 86 and 76 to ground potential. If a binary "0" is presented on lead 54 for recordation, this current flow and consequent polarity of magnetic saturation of track 10 is continued through the incremental stepping of track 10 to record the digit. If, on the other hand, a binary "1" is presented on lead 54 for recording on track 10, write control circuit 64 removes ground potential from lead 76 and connects ground potential to lead 78, thereby switching the direction of current flow through the winding of transducer 14 and consequently reversing the polarity of magnetic saturation of track 10 during the incremental stepping thereof. This latter current path may be traced from source 70 through resistor 71 over leads 76 and 86 through the winding of transducer 14 over leads 88 and 78 to ground.

Record-erase circuit 60 further includes an erase source 62 which is connected to erase transducer 12 positioned adjacent track 10 upstream from record transducer 14. The function of erase source 62 and erase transducer 12 is to place a pre-bias magnetization on track 10, that is, to saturate track 10 in a predetermined polarity direction prior to its passing adjacent record transducer 14. For example, track 10 may be saturated thereby in a negative polarity direction, as assumed herein for the purposes of illustration.

For recording verification in accordance with the principles of my invention, the inputs of readout amplifier 90 are coupled to leads 76 and 78, the output of amplifier 90 being connected to verification utilization means 95. Amplifier 90 comprises well-known readout amplifier circuitry and advantageously is alternating current coupled to leads 76 and 78, such as via capacitors 91 and 92. Verification utilization means 95 includes known circuitry for utilizing the recording verification signals from amplifier 90 in accordance with the particular system application employing my verification method. Utilization means 95, for example, may provide an alarm, terminate recording, or initiate corrective action when the verification signals indicate that the information signals recorded on track 10 differ from those presented by source 50 on lead 54 for recording. The information signals on lead 54 are extended to verification utilization means 95 for recording verification purposes via lead 58.

Figure 2:
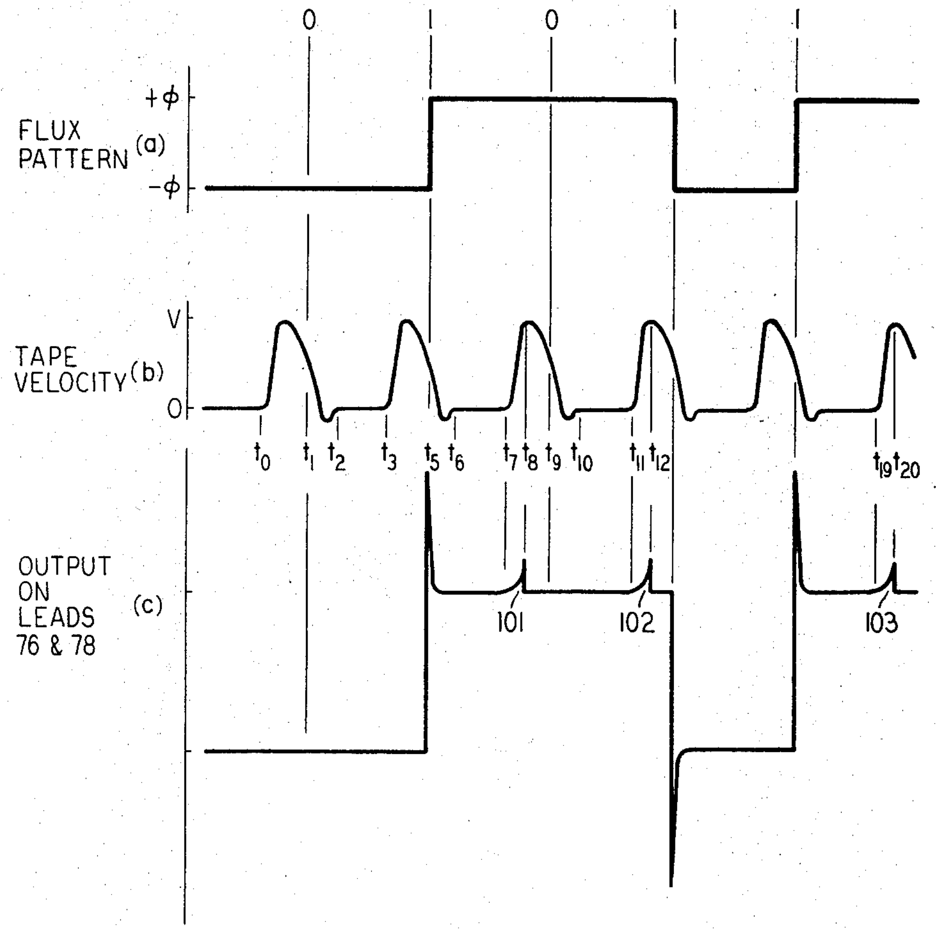
FIG. 2 is a time chart useful in describing the operation of the illustrative embodiment of FIG. 1.

The operation of the arrangement in FIG. 1 in providing recording verification according to my invention may be better understood by reference to the time chart of FIG. 2. A typical NRZI magnetic flux pattern on track 10 is depicted in FIG. 2(*a*). As can be seen from FIG.

2(*a*), track 10 resides at all times in a saturated condition in either one or the other magnetic polarities represented by the usual symbols "+" and "−" in the drawing. The polarity of magnetic saturation of track 10 is continued for recording a binary "0" and is reversed for recording a binary "1." Thus, the typical recorded binary information pattern depicted in FIG. 2 between times $t_0$ and $t_{19}$ is "01011." Although not shown in FIG. 2, as mentioned above it is assumed herein that track 10 is saturated by erase transducer 12 in a negative polarity direction prior to track 10 passing adjacent record transducer 14.

The incremental stepping movement of magnetic track 10 under the control of incremental drive 40 is depicted in FIG. 2(*b*), the movement of track 10 varying between zero velocity and velocity V. Track 10 is assumed to be initially stopped. When a digit is presented for recording, incremental drive 40 accelerates track 10 to velocity V, and the digit is recorded while track 10 decelerates to a stopped condition. During the interval between times $t_7$ and $t_8$ in FIG. 2(*b*), for example, track 10 is accelerated from a stopped condition to velocity V. At time $t_9$ the binary digit "0" is recorded and at time $t_{10}$ track 10 has decelerated to a stopped condition.

The output signal appearing on leads 76 and 78 to readout amplifier 90 is depicted in FIG. 2(*c*). When the recording current applied to record transducer 14 on leads 76 and 78 opposes the pre-bias magnetization applied to track 10 by transducer 12, a magnetic transition occurs on track 10 upstream from transducer 14, the distance upstream being principally determined by the controlled step overshoot of track 10. As track 10 is adcanved incrementally, the transition moves toward transducer 14 causing a change in the flux through transducer 14. This flux change through transducer 14 is sensed in accordance with my invention and utilized advantageously for verification of recording operation. No modification of record transducer 14 or the recording circuitry is required nor is it necessary to alter the recording operation in any manner. The recording verification signals appear in the form of pulses, such as pulses 101, 102, and 103 in FIG. 2(*c*), which are on the order of 30 percent of the magnitude of the normal readout signals in the illustrative embodiment herein. The recording verification signals are detected and amplified by amplifier 90 and applied to verification utilization means 95.

Consider now the operation of the embodiment of FIG. 1 in incrementally recording the typical information pattern depicted in FIG. 2. Just prior to time $t_0$ track 10 is assumed to be stopped and the portion of track 10 adjacent record transducer 14 is assumed to be saturated in the negative polarity direction, current flowing through transducer 14 from source 72 to ground potential on lead 76. At time $t_0$ source 50 presents a binary "0" on lead 54 to be recorded and, via path 52, energizes incremental drive 40. Drive 40, through capstan 42, accelerates track 10 up to velocity V and at time $t_1$ the binary "0" is recorded. Track 10 decelerates to a stopped condition at time $t_2$. Thus, during the interval between times $t_0$ and $t_2$ track 10 is stepped forward a predetermined increment D, as depicted in FIG. 4. Inasmuch as the digit to be recorded is a binary "0," the existing current flow through transducer 14 is maintained during this interval to saturate the stepped increment of track 10 in the negative direction, as shown in FIG. 2(*a*).

Track 10 may then remain stopped until at some subsequent time, such as time $t_3$, when source 50 presents another binary digit on lead 54, illustratively a binary "1," to be recorded. Track 10 is again accelerated to velocity V, and at time $t_5$ in FIG. 2 write control circuit 64 reverses the ground connection, removing ground from lead 76 and connecting ground to lead 78. The current flow through transducer 14 is thereby reversed, in turn reversing the magnetization saturation polarity of track 10. Shortly thereafter at time $t_6$ track 10 returns to a stopped condition.

At this point, then, the current flow through record transducer 14 opposes the negative pre-bias magnetization of track 10. When the next digit is presented for recordation and track 10 is accelerated toward velocity V at time $t_7$ in FIG. 2, the upstream magnetic transition on track 10 produces a flux change in transducer 14. This flux change in turn induces a voltage across leads 76 and 78 which increases until the upstream transition reaches the leading edge of transducer 14, at which point the field produced by the current flow through transducer 14 reorients the upstream transition to reduce the induced voltage to zero. This induced voltage is depicted by recording verification pulse 101 at time $t_8$ in FIG. 2(*c*) which is applied by readout amplifier 90 to verification utilization means 95. The magnitude of the recording verification pulse is proportional to the velocity of track 10 at the time the upstream transition arrives at the leading edge of transducer 14, and thus is principally determined by the overshoot of track 10.

Subsequent digits of information presented on lead 54 are recorded incrementally in a similar manner. Each time track 10 is stepped incrementally with the current flowing through record transducer 14 opposing the prebias magnetization of track 10, such as at times $t_{11}$–$t_{12}$ and $t_{19}$–$t_{20}$, recording verification signals, such as pulses 102 and 103, are applied by readout amplifier 90 to verification utilization means 95. Thus, a pulse is generated each time track 10 is advanced incrementally if the information previously recorded on track 10 opposed the pre-bias magnetization provided by erase transducer 12 and source 62. Accordingly, verification utilization means 95 may advantageously comprise simple checking circuitry employing the verification signals, such as pulses 101, 102 and 103, to verify proper recording of the information on track 10.

Although the present invention has been described in terms of recording on a single channel magnetic track with a single record transducer, it will be recognized that the invention is equally applicable to recorders having a plurality of parallel channels and a corresponding plurality of record transducers. In parallel channel incremental recorders the verification method described above is employed substantially simultaneously in connection with each channel.

What is described hereinabove, therefore, is a novel arrangement for verifying recording on an incremental recorder immediately after recording. It is to be understood that the particular arrangements described above are but illustrative of the application of the principles of the invention. Numerous other arrangements may be devised by those skilled in the art without departing from the spirit and scope of the invention.

What is claimed is:

1. In combination; a movable magnetic storage medium; record transducer means disposed in recording relationship with said medium; means for moving said medium in a forward direction past said transducer means in discrete incremental steps; means for applying recording signals to said transducer means; and recording verification means comprising means for magnetizing said storage medium in a predetermined manner prior to the recording of signals thereon, means including said moving means for providing a predetermined overshoot at the end of each incremental step of said medium and readout means coupled to said record transducer means.

2. The combination in accordance with claim 1 wherein said magnetizing means comprises second transducer means disposed in recording relationship with said storage medium and positioned relative to said record transducer means such that said storage medium passes adjacent said second transducer means prior to passing adjacent said record transducer means, and means for applying current to said second transducer means to saturate said storage medium in a predetermined magnetic polarity direction.

3. The combination in accordance with claim 2 wherein said recording signal applying means comprises means for continuously applying current to said record transducer means and for selectively reversing the polarity of said current during the incremental stepping of said storage medium, the incremental stepping of said storage medium generating a recording verification signal when the polarity of the current applied to said record transducer means opposes the predetermined magnetic polarity of said storage medium.

4. The combination in accordance with claim 3 wherein said readout means comprises a readout amplifier, and alternating current coupling means connecting said readout amplifier to said record transducer means.

5. The combination in accordance with claim 1 wherein said overshoot means comprises means coupled to said moving means and operative in conjunction with said moving means for providing a predetermined movement of said storage medium in a reverse direction past said record transducer means at the end of each incremental step of said medium.

6. The combination in accordance with claim 5 wherein said magnetizing means comprises second transducer means disposed in recording relationship with said storage medium and positioned upstream relative to said record transducer means such that said storage medium passes adjacent said second transducer means prior to passing adjacent said record transducer means, and means for applying current to said second transducer means to saturate said storage medium in a predetermined magnetic polarity direction, said reverse direction movement of said storage medium at the end of an incremental step providing a magnetic polarity transition on said medium upstream relative to said record transducer means when the recording signals applied to said record transducer means oppose the predetermined magnetic polarity of said storage medium.

7. The combination in accordance with claim 6 wherein said readout means comprises means for sensing said upstream magnetic transition during the next incremental step of said medium.

References Cited

UNITED STATES PATENTS

| | | | |
|---|---|---|---|
| 3,359,548 | 12/1967 | Yoshii et al. | 340—174.1 |
| 3,365,708 | 1/1968 | Markakis | 340—174.1 |
| 3,368,211 | 2/1968 | Taris | 340—174.1 |

JAMES W. MOFFITT, Primary Examiner

V. P. CANNEY, Assistant Examiner